March 29, 1927.

L. H. VERVOORT

BEARING

Filed Nov. 8, 1923

1,622,618

INVENTOR
Lambert H. Vervoort

BY Frank D. Gray

ATTORNEY

Patented Mar. 29, 1927.

UNITED STATES PATENT OFFICE.

LAMBERT H. VERVOORT, OF COUDERSPORT, PENNSYLVANIA.

BEARING.

Application filed November 8, 1923. Serial No. 673,503.

My invention relates to roller bearings, its general object being to provide a bearing simple in construction and readily manufactured.

My invention relates more particularly to the type known as taper or conical roller bearings and having the usual cage comprising stayed apart end plates, the latter having spaced and radially elongated bearing sockets or grooves in their inner faces to restrain the rollers mounted in the cage from relative movement circumferentially, though permitting slight radial movement for adjustment of the rollers to the bearing surfaces.

One of the objects of my invention is to provide such a bearing having end plates formed conical in shape so that their faces may be positioned at right angles to the axis of the stay rods and of the rolls.

A further object is the provision of frusto-conical rollers mounted between inner and outer bearing members and having the inner end plate of the cage enclosed by both of said members, while the outer end plate is overlapped by neither member but itself projects inwardly and over the outer edge of the cone or inner bearing member, thus preventing the rolls and cage from slipping off the cone.

Other objects and advantages of my invention will appear as the description proceeds.

The annexed drawing and the following description set forth in detail certain means embodying my invention, the disclosed structure however, constituting but one of the various forms in which the principle of the invention may be applied.

Figure 1:
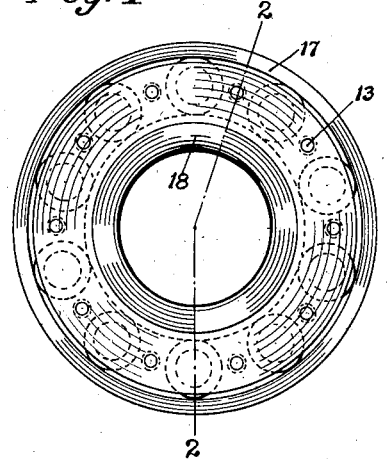
Fig. 1 is an end view of my bearing.
Figure 2:
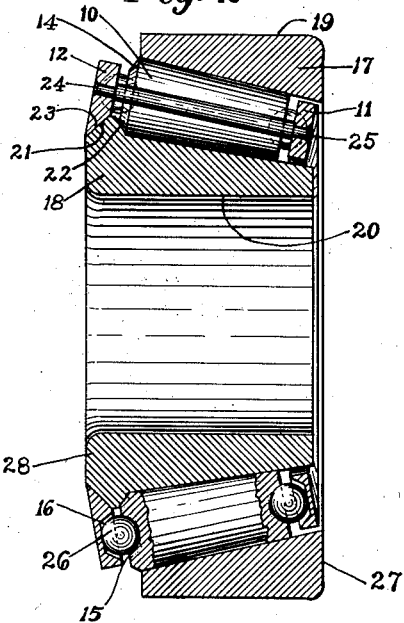
Fig. 2 is a section taken on the line 2—2 of Fig. 1.
Figure 3:
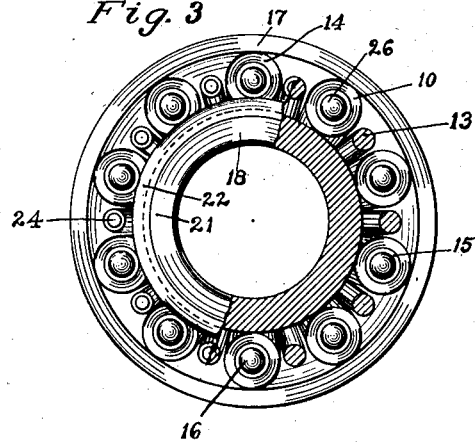
Fig. 3 is an end view with the end plate removed, and a portion of the inner race shown in transverse section.
Figure 4:
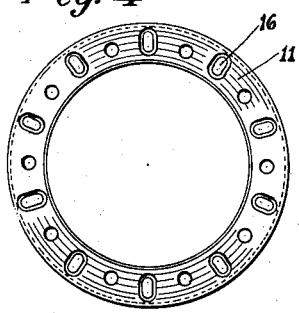
Fig. 4 is a face view of the inner end plate.
Figure 5:
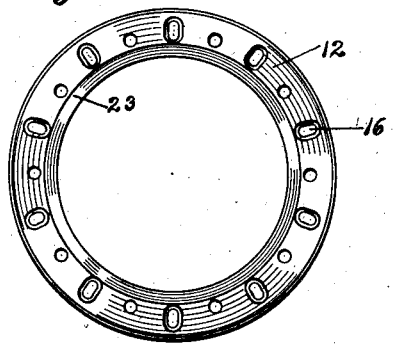
Fig. 5 is a similar view of the outer end plate.

In the form of my invention shown particularly in Fig. 1, the bearing cage consists of a series of frusto-conical rollers 10 mounted between annular end plates 11 and 12, the latter being positioned at the outer end of the cone, and the former being the smaller and positioned at the inner end. These end plates are stayed in spaced relation by rods or posts 13 having reduced ends 24 and 25 piercing the plates and riveted thereto. The rollers 10 are slightly beveled at 14 at the larger end and squared at the opposite ends. These rollers are provided at each end with ball seats 15, the balls 26 being seated in the ends of the rollers as well as in bearing depressions 16 in the plates 11 and 12, the said depressions being elongated radially for slight outward movement of the rollers as they revolve about the inner race.

The outer race member or sleeve 17 has an inner frusto-conical cup surface to receive the rollers therein and the inner frusto-conical race member or sleeve 18 is provided peripherally with a bearing surface so that when the parts are assembled, the outer and inner surfaces 19 and 20 of the two sleeves 17 and 18, respectively, are substantially parallel. At the outer edge of the cone member 18 is shown a beveled surface 21, and adjacent such surface a shoulder 22 against which the larger end of the rollers bear when the bearing is in action. The inner edge of the ring 12 is provided with a flange having a beveled surface 23 corresponding to the surface 21 of the inner sleeve 18. These beveled surfaces provide for an overlapping of the ring member 12 over the edge of the member 18 which effectively prevents the rollers and cage from slipping off the cone 18, thus making the rollers, balls, retaining rings and cone 18 of the bearing, a unit and non-separable.

When the bearing is in operation and the rollers are carrying a load thereon, it will be evident that the effect of centrifugal force will be to hold ring 12 with its surface 23 as far away from the cone 18 as possible, the limit of said movement being reached by contact of the surface 14 of the rollers against the shoulder 22. This provides the very desirable construction by which inner movement of the cage with its rollers is limited by the overlapping flange of the ring 12, and outward thrust limited by the shoulder 22. A very desirable advantage arising from this arrangement lies in the fact that the small end of the cone 18 is left free to be ground and finished with relatively less expense, and also that the accuracy of the finished product is more easily measured.

While I have shown the ring 12 beveled for the purpose mentioned above, I do not restrict myself to this particular shape of the contacting surfaces 21 and 23, as the inner edge of ring 12 may be square and a shoulder of corresponding shape cut in the cone 18 to serve the same purpose. The generic idea of my new construction is the provision of the flange on the retainer ring or plate 12 projecting inward over the cone and thus preventing the rollers from being separated therefrom.

The conical end plate 11 is not controlled in any way directly by either bearing member 17 or 18. It is mounted upon the rollers by means of the series of posts 13 and lies well within the inner face of the entire bearing and rotates in the space between said members, the control of said cage posts being held by the ring 12 as above explained.

A great advantage in efficiency and the cost of manufacture, arises from the fact that the rings 11 and 12 are themselves frusto-conical in outline and can therefore be mounted upon the stay rods at right angles thereto and to the axes of the rollers 10. This arrangement permits the provision of square shoulders on the ends 24 and 25 of said rods or posts 13 to fit squarely against the faces of both said rings. Without this very important provision, it has heretofore been thought necessary in the use of taper roller bearings, to provide an angular face on the retainer plate which adds not only to the cost of production but also to the expense of assembly.

The construction here disclosed provides a bearing that is exceptionally clean at the ends. It is especially to be noted that on the outer end of the bearing, no part extends beyond the end face of the cone 18; and at the other end, no part extends beyond the inner face of the cup member 17, so that what is in many bearings a very troublesome feature, gives no concern by this construction, since what clears the outer face of the cone member will clear that end of the bearing; and the plane of the inner face of the cup member clears the inner end of the bearing. I regard this feature very important.

In this disclosure I have shown the form of bearing of this type preferred by me, but no attempt has been made to show possible modifications which might be employed which might fall well within the spirit and scope of the appended claims, and therefore I do not wish my invention to be limited beyond the terms therein recited.

I claim:

1. In a bearing, in combination a frusto-conical roller cage comprising end plates stayed apart, one smaller than the other each being provided on its inner face with laterally spaced ball seats and laterally spaced stay rods connecting said end plates and having reduced ends whereby the latter are provided with shoulders, the faces of said end plates being mounted at right angles to said rods and fitting snugly against said shoulders, frusto-conical rollers mounted between said plates, each roller being provided with ball seats in its ends, and balls mounted between said rollers and end plates and positioned in said seats.

2. In a bearing, a pair of spaced, telescopic concentric sleeves having conical surfaces therebetween, a series of frusto-conical rollers adapted to play in the said space, a roller cage for guiding said rollers comprising inner and outer end plates both of which are annular and conical in outline, and a series of stay rods connected to said plates to hold them in spaced relation, the latter being mounted on the rods at right angles thereto.

3. In a bearing, the combination of concentric inner and outer sleeves having a conical intermediate raceway therebetween, a series of frusto-conical bearing rollers positioned in said raceway, a pair of annular plates spaced apart for guiding said rollers, and each plate positioned oblique to the axes of said sleeves and parallel to each other, anti-friction means for mounting the ends of the rollers upon the inner faces of the said plates, the larger plate having an inner extension overlapping a portion of the surface of the inner sleeve and the smaller plate being conical in outline and wholly enclosed in said intermediate space.

4. In a bearing, a cup member, a series of frusto-conical rollers and an inner conical race member, in combination with a roller cage comprising end plates stayed apart in conical relation, the outer end plate having an overlapping flange projecting inwardly over the edge of the inner cone member and having depressions on its inner face, said rollers being mounted between said plates and having depressions in their ends, and balls seated in the ends of the roller and in said depressions, the bearing surface of the inner cone member being provided with a peripheral shoulder adjacent its outer end against which the larger ends of the rollers are adapted to contact when the bearing is in operation, whereby the inner cone member, end plates, rollers and balls form a nonseparable unit.

5. In a bearing, in combination, inner and outer sleeves, the former having a frusto-conical outer surface and a cylindrical inner surface and the latter a cylindrical outer surface and a frusto-conical inner surface, a series of longitudinally disposed rollers interposed between said sleeves, a pair of spaced bearing rings arranged adjacent to the ends of the several rollers, said rings being conical in shape and mounted at right angles to the axes of said rollers, the larger ring having an extension overlapping the larger end of the inner sleeve and the latter having a peripheral shoulder adjacent its outer face whereby the larger ends of the rollers may be seated against the shoulder, and the sleeve, rollers and rings form a non-separable unit.

6. In a frusto-conical roller cage, for guiding a peripheral series of rollers therein a pair of end plates stayed apart, each being annular and conical in outline and having on their inner faces a series of spaced sockets, and the faces of each end plate being arranged at right angles to the axes of the rollers.

7. In a bearing, a pair of spaced, telescopic concentric sleeves having conical surfaces therebetween, a series of frusto-conical rollers adapted to play in said space, a roller cage comprising end plates stayed apart by rods, one of said plates being smaller than the other and each having on its inner face laterally spaced and radially elongated ball seats, each roller having a ball seat in its ends, and balls mounted between said rollers and said end plates and having radial play in said seats in the end plates.

In testimony whereof I hereunto affix my signature.

LAMBERT H. VERVOORT.